United States Patent [19]
Anderson et al.

[11] 3,931,552
[45] Jan. 6, 1976

[54] CAPACITOR ELECTROLYTE

[75] Inventors: Daniel J. Anderson; James C. Jimerson, both of Indianapolis, Ind.

[73] Assignee: P. R. Mallory & Co., Inc., Indianapolis, Ind.

[22] Filed: Apr. 21, 1971

[21] Appl. No.: 136,230

Related U.S. Application Data

[62] Division of Ser. No. 804,986, March 6, 1969, abandoned.

[52] U.S. Cl. ............................. 317/230; 252/62.2
[51] Int. Cl.$^2$ ......................................... H01G 9/02
[58] Field of Search ....... 252/62.2; 317/230; 29/570

[56] References Cited
UNITED STATES PATENTS

| | | | |
|---|---|---|---|
| 1,769,228 | 7/1930 | Lundeen | 317/230 X |
| 2,786,165 | 3/1957 | Ross | 317/230 |
| 2,965,817 | 12/1960 | Petersen | 317/230 |
| 3,138,746 | 6/1964 | Burger et al. | 317/230 |
| 3,293,506 | 12/1966 | Chesnot | 317/230 |
| 3,345,544 | 10/1967 | Metcalfe | 317/230 |

FOREIGN PATENTS OR APPLICATIONS

| | | |
|---|---|---|
| 1,049,058 | 11/1966 | United Kingdom |
| 152,238 | 5/1962 | U.S.S.R. |
| 935,804 | 12/1955 | Germany ........................... 317/230 |

*Primary Examiner*—William D. Larkins
*Attorney, Agent, or Firm*—Charles W. Hoffmann; Robert F. Meyer; Donald W. Hanson

[57] ABSTRACT

Chromate radicals are used in a capacitor electrolyte comprising a polar organic solvent containing an ionizable salt in order to improve the elevated temperature properties, shelf life and storage life of electrolytic capacitors.

10 Claims, No Drawings

CAPACITOR ELECTROLYTE

This is a division of application Ser. No. 804,986, filed Mar. 6, 1969, now abandoned.

This invention relates to capacitor electrolytes and capacitors made therefrom, and to a method of improving elevated temperature properties, shelf life, and storage life of electrolytic capacitors.

It has been observed that electrolytic capacitors often degrade if allowed to stand for long periods of time without the application of voltage. This degradation may take the form of a change in effective capacitance and/or higher D.C. leakage current after application of voltage. In some instances application of rated voltage after capacitors have been allowed to stand too long may permanently damage the capacitor.

It has been found that these undesirable effects of storing are caused by changes which the dielectric oxide has undergone during storage and/or shelf life.

Also, one of the most important environments in which electrolytic capacitors must operate is at elevated temperatures. As the temperature increases the insulating ability of many dielectrics breaks down. This in turn lowers the useful working voltage of the capacitor. This problem has also been traced to changes which the dielectric oxide has undergone.

Furthermore, the storage at elevated temperature results in a compounding of the degrading effects of storage and temperature.

It is one object of the present invention to provide a capacitor electrolyte which will give long storage shelf life.

It is another object of the present invention to provide a capacitor electrolyte which will not suffer dielectric oxide changes after long periods of storage.

It is another object of the present invention to provide a capacitor electrolyte which will withstand elevated temperatures for long periods of time.

It is another object of the present invention to provide an electrolytic capacitor which will not suffer dielectric change or break down during operation at elevated temperature.

It is another object of this invention to provide an electrolyte for capacitors wherein the effective capacitance of the capacitors does not change substantially after being stored for long periods of time without the application of voltage.

It is another object of the present invention to provide a capacitor electrolyte which will reduce the incresse in the D.C. leakage current after being allowed to stand for long periods of time without the application of voltage.

It is another object of the present invention to provide a capacitor electrolyte which will reduce dielectric oxide degradation after the capacitor is stored for extended periods of time at elevated temperature.

Other objects of the present invention will be apparent from the following description.

It has been found according to the present invention that chromate radicals when at least partially dissolved in the capacitor electrolyte will substantially reduce and/or eliminate the previously mentioned problems and achieve the foregoing objects.

The chromate radicals may be placed in the electrolyte in any convenient manner, such as by adding chromate containing salts, acids or complexes which are at least partially soluble in the electrolyte. Useful radicals include both chromate radicals and dichromate radicals. It is believed that when the radicals are dissolved in the electrolyte, they are at least partially ionized.

The concentration of chromate radicals in the electrolyte must be from about 0.01% to about 2.5% by weight of the electrolyte dissolved in the electrolyte. Preferably the concentration is 0.1 to 1% by weight dissolved in the electrolyte.

The electrolyte additive of the present invention can be used in practically any of the known types of liquid electrolyte capacitors. This includes, for example, the wound cartridge type, the sintered slug type, the impregnated type, the gel type, the impregnated cartridge type, etc.

The additive of the present invention may be used in any liquid or semi-liquid electrolyte comprising an organic polar solvent containing an ionizable solute dissolved therein. Such electrolytes are known in the capacitor art. For example, suitable organic solvents include the glycol ethers, particularly lower alkyl (1–6 carbon atoms) glycol mono and di ethers having up to about 20 carbon atoms, for example including ethylene glycol monomethyl and dimethyl ethers, ethylene glycol monoethyl and diethyl ethers, ethylene glycol monopropyl and dipropyl ethers, ethylene glycol monobutyl and dibutyl ethers, diethylene glycol monoethyl and diethyl ethers, diethylene glycol monomethyl and dimethyl ethers, diethylene glycol monopropyl and dipropyl ethers, diethylene glycol monobutyl and dibutyl ethers, cyclic organic alcohols, particularly monocyclic 5 and 6 membered ring alcohols including cyclohexanol, benzylalcohol, tetrahydrofurfuryl alcohol, also nitrogen mono and disubstituted amide compounds particularly substituted lower alkyl groups attached to the nitrogen according to the formula

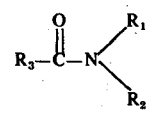

where $R_1$, $R_2$ and $R_3$ may be hydrogen or lower alkyl groups (having 1 to 6 carbon atoms). Examples include dimethylformamide and diethylacetamide.

The ionizable solute may be made for example by neutralizing or partially neutralizing an acid. Exemplary inorganic acids include boric acid, phosphoric acid and mixtures thereof. Exemplary organic acids which may be neutralized for this purpose include mono and dicarboxylic acids, having up to about 12 carbon atoms, including maleic acid, malonic acid, benzoic acid, picric acid and tartaric acid and mixtures thereof.

These acids may be neutralized with ammonia, aliphatic amines, particularly alkyl amines having up to 12 carbon atoms such as triethyl amine, trimethyl amine, tributyl amine, alkanol amines having up to 12 carbon atoms such as monoethanol amine, diethanolamine amine, monopropanolamine, dipropanolamine and tripropanol amine. Still other neutralizing agents include nitrogen base compounds such as guanidine type compounds

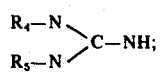

$R_4$ and $R_5$ are lower alkyl, aryl or H, and cyclic nitrogen compounds including pyridines and substituted pyridines such as mono and disubstituted pyridines, more particularly lower alkyl substituted pyridines, for example lutidine and picoline.

The amount of solute used may vary from a very small amount, for example 0.01% by weight of the solvent, all the way up to the solubility limit of solvent and slight excesses above the solubility limit may be permitted in some applications.

The anode and the cathode of the capacitor may be made of any of the known valve metals including for example aluminum, titanium, niobium and tantalum. However, the preferred valve metal for wound impregnated cartridge capacitors is aluminum.

The chromate and dichromate radicals may be added as acids or be present in the electrolyte as acids which are at least partially soluble in the electrolyte such as chromic acid. The radicals may also be added or be present in the electrolyte as chromate or dichromate salts or complexes. While some chromate and dichromate metallic salts such as alkali metal salts, alkaline earth metal salts, etc. may be used to provide the chromate radicals, in general these salts are somewhat less soluble in the electrolyte than are the non-metallic salts. Additionally when metallic salts are used in some cases there is some tendency for metallic ions to plate out at the cathode, which may cause undesired shorting. For these reasons, non-metallic salts and complexes are preferred. Exemplary non-metallic salts include ammonium chromates, amine chromates and amine chromate complexes including aliphatic and aromatic amine chromates particularly aryl and alkyl amine chromates, dichromates and complexes and alkanol amine chromates and dichromates and complexes and mixtures thereof having up to 20 carbon atoms, also in the electrolyte, the chromate radicals may be complexed with ammonia and/or the amines, and/or a portion of the polar organic solvent and/or the ionizable salt including both the acid and base portion thereof used in the neutralization reaction to form the ionizable salt. From a practical standpoint the most preferred salts are ammonium chromate, ammonium dichromate, ammonium chromate complexes and mixtures thereof.

The properties of the capacitors utilizing the electrolyte additive and electrolyte of the present invention may very widely. The capacitors may be made so as to withstand a wide range of voltages from 1 volt up to 500 volts, and higher, and have capacitances varying widely from about 1 microfarad to 1 farad or higher, if desired.

The capacitors may be operated throughout a wide temperature range, for example at temperatures at $-75°C$ to $+175°C$.

Capacitors utilizing electrolyte of the present invention have a high reliability of having a storage or shelf life of at least two years at room temperature and shelf lives as long as three to five years and longer are very common.

The shelf life at elevated temperatures of capacitors utilizing the additive and electrolyte of the present invention is also very good. At temperatures of 25° to 50°C a shelf life of two years and longer may be expected with high reliability; at 50°–85°C a high reliability after one year storage and longer is obtained. At 85°–125°C a high reliability after 6 months and longer is obtained.

EXAMPLE I

Twelve capacitors rated at 10 microfarads at 150 volts D.C. were impregnated with the following electrolyte system: 95 grams diethylformamide, 6.0 grams boric acid, 0.5 grams maleic acid, 0.5 grams malonic acid, 0.2 grams phosphoric acid, 0.1 grams ammonium dichromate. Tributylamine was added to raise the pH to 5.7.

A second group of capacitors was impregnated with the same solution except no ammonium dichromate was contained in the solution.

All the capacitors were tested at room temperature before exposure and after exposure to 250° hours at 85°C, and cooling to room temperature. The results are shown in Table I.

TABLE I

| 85°C Exposure | | | |
|---|---|---|---|
| with ADC | | without ADC | |
| I (Micro-amps) | | I (Micro-amps) | |
| Before Exposure | After 250 Hr. Exposure | Before Exposure | After 250 Hr. Exposure |
| .37 | 3.6 | .36 | 7.8 |
| .23 | 2.6 | .36 | 5.1 |
| .94 | 3.4 | .60 | 9.4 |
| .24 | 4.3 | .48 | 5.0 |
| .56 | 3.5 | .41 | 5.4 |
| .78 | 2.4 | .41 | 4.9 |
| .23 | 3.2 | | |

EXAMPLE II

Twelve capacitors rated at 10 microfarads at 150 volts D.C. were impregnated with the following electrolyte system: 95 grams dimethylformamide, 6.0 grams boric acid, 0.5 grams maleic acid, 0.5 grams malonic acid, 0.2 grams phosphoric acid, 0.1 grams ammonium dichromate. Tributylamine was added to raise the pH to 5.7.

A second group of capacitors was impregnated with the same solution except no ammonium dichromate was contained in the solution.

All the capacitors were tested at room temperature before exposure and after exposure to 250 hours at 125°C, and cooling to room temperature. The results are shown in Table II.

TABLE II

| 125°C Exposure | | | |
|---|---|---|---|
| with ADC | | without ADC | |
| I (Micro-amps) | | I (Micro-amps) | |
| Before Exposure | After 250 Hr. Exposure | Before Exposure | After 250 Hr. Exposure |
| .45 | 22.2 | .38 | 32.2 |
| .24 | 18.9 | .16 | 31.0 |
| .52 | 26.6 | .23 | 49.7 |
| .27 | 18.4 | 1.38 | 35.9 |
| .74 | 21.1 | .68 | 38.8 |
| .25 | 24.5 | 1.39 | 25.1 |
| .75 | 22.8 | | |

We claim:

1. A liquid or semi-liquid electrolyte capacitor including anode electrode means of a valve metal, a valve metal oxide in contact with the anode electrode means, cathode electrode means, and electrolyte means contacting the valve metal oxide and the cathode electrode means, the electrolyte means comprising an organic solvent including glycol monoethers or diethers having up to 20 carbon atoms or amides having the formula

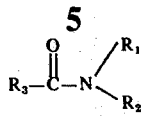

where $R_1$, $R_2$ and $R_3$ are H or lower alkyl and mixtures thereof, the organic solvent has dissolved therein an ionizable solute of 0.01 wt.% up to the solubility limit of the organic solvent, the ionizable solute including acid at least partially neutralized and a neutralizing agent, the acid including boric acid or phosphoric acid or mono and dicarboxylic acids having up to 12 carbon atoms and mixtures thereof, the neutralizing agent including ammonia or alkyl and alkanol amines having 4 to 12 carbon atoms or guanidine type compounds having the formula

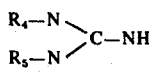

where $R_4$ and $R_5$ are lower alkyl or aryl or H, cyclic nitrogen compounds including pyridine or substituted pyridines and mixtures thereof, and a substance separate from the ionizable solute including acids or non-metal salts or chromium oxygen complexes and mixtures thereof, the substance yielding in solution chromate radicals having at least some solubility in the electrolyte to the extent of about 0.01% to about 2.5% by weight of the electrolyte.

2. The capacitor of claim 1, wherein the nonmetallic salt of the electrolyte means includes ammonium salts or aliphatic amine salts having up to 20 carbon atoms or aromatic amine salts having up to 20 carbon atoms and mixtures thereof.

3. The capacitor of claim 2, wherein the aliphatic amine salt of the electrolyte means includes alkyl and alkanol amine salts and mixtures thereof.

4. The capacitor of claim 1, wherein the complex of the electrolyte means is formed with a substance including ammonia or amines or the organic solvent or the ionizable solute and mixtures thereof.

5. The capacitor of claim 1, wherein the chromate radical of the electrolyte means is present as a chromate or dichromate and mixtures thereof.

6. The capacitor of claim 1, wherein the non-metal salt of the electrolyte means is an ammonium salt.

7. The capacitor of claim 1, wherein the amide of the electrolyte means includes dimethylformamide or diethylacetamide and mixtures thereof.

8. The capacitor of claim 1, wherein the carboxylic acid of the electrolyte means includes succinic acid or tartaric acid or picric acid or maleic acid or malonic acid and mixtures thereof.

9. The capacitor of claim 1, wherein the electrolyte means consists essentially of 95 parts diethylformamide, 6 parts boric acid, 0.5 parts maleic acid, 0.5 parts malonic acid, 0.2 parts phosphoric acid, 0.1 parts ammonium dichromate and tribulylamine in an amount sufficient to effect a pH of about 5.7 in the solution.

10. A method of improving the shelf life and storage life of a capacitor by using in the capacitor the electrolyte of claim 1.

* * * * *